United States Patent [19]

Lin

[11] Patent Number: 5,322,870
[45] Date of Patent: Jun. 21, 1994

[54] ADDITIVE PACKAGE FOR IN SITU PHOSPHATIZING PAINT, PAINT AND METHOD

[75] Inventor: Chhiu-Tsu Lin, DeKalb, Ill.

[73] Assignee: Board of Regents, Northern Illinois University, DeKalb, Ill.

[21] Appl. No.: 997,865

[22] Filed: Dec. 29, 1992

[51] Int. Cl.$^5$ .................. C08K 5/521; C08K 5/524; C08K 5/5333
[52] U.S. Cl. ............................ 524/132; 524/130; 524/139; 524/140; 524/145; 524/147; 252/389.23; 252/389.24
[58] Field of Search ............ 524/130, 132, 136, 138, 524/139, 133, 140, 141, 145, 147, 151; 252/387, 388, 389.2, 289.21, 389.24, 389.23

[56] References Cited

U.S. PATENT DOCUMENTS

| | | | |
|---|---|---|---|
| 1,995,954 | 3/1935 | Albrecht | 134/26 |
| 4,032,678 | 6/1977 | Perfetti et al. | 427/388 |
| 4,508,765 | 4/1985 | Ring et al. | 427/386 |

FOREIGN PATENT DOCUMENTS

| | | | |
|---|---|---|---|
| 0163796 | 9/1983 | Japan | 524/145 |
| 0033479 | 2/1988 | Japan | 524/145 |
| 0066266 | 3/1988 | Japan | 524/140 |

OTHER PUBLICATIONS

"Chemistry of a Single-Step Phosphate/Paint System" by Chhiu-Tsu Lin, Ping Lin, & Meen-Woon Hsiao, 1992 American Chemical Society.

*Primary Examiner*—Paul R. Michl
*Assistant Examiner*—Peter Szekely
*Attorney, Agent, or Firm*—Wood, Phillips, Van Santen, Hoffman & Ertel

[57] ABSTRACT

An additive package can be used in a single-coat, in situ self-phosphatizing paint to provide a phosphate layer that inhibits corrosion of a surface on which the paint is applied. The additive package includes an amine and a phosphatizing reagent that can be an alkyl-, phenyl- or aryl-ester phosphoric acid or an alkyl-, phenyl- or aryl-phosphonic acid. The reagent and the amine are present in a ratio effective to produce reagent-amine complexes. A paint can include the additive package in addition to a polymer coat forming resin and a cross-linking agent.

17 Claims, No Drawings

ADDITIVE PACKAGE FOR IN SITU PHOSPHATIZING PAINT, PAINT AND METHOD

TECHNICAL FIELD

An additive package for in situ phosphatizing paint provides reagent-amine complexes to stabilize the reagent. The paint protects a metal surface by forming a non-conductive phosphate layer that inhibits corrosion. A method includes the steps of applying the paint to the surface and forming the layer and a protective topcoat.

BACKGROUND OF THE INVENTION

Surface treatments for substrates, e.g., metal, are conventional to inhibit corrosion and improve adhesion of subsequent coatings. One such surface treatment is phosphate conversion coating that phosphatizes the surface by producing a non-conductive phosphate crystalline/amorphous layer on the surface that insulates the metal from subsequently applied coatings and provides a topograpy having chemical functionality for reacting with the coating.

Representative of the phosphate conversion coating processes are an iron phosphate coating process and a zinc phosphate coating process that use a bath of iron phosphate or zinc phosphate, respectively. Both processes require multiple steps including meticulous cleaning pretreatment of the surface, dipping in the bath and rinsing followed by application of the coating. If the cleaning pretreatment is not properly performed, the surface will be defective in that it will have less corrosion protection, and hence will be more likely to corrode, than a nondefective surface. The iron phosphate coating process requires close chemical control of the bath to achieve reproducibility and satisfactory results. The zinc phosphate coating composition is more complex and expensive than the iron phosphate coating process and requires additional chemical additives. Some of these additives are environmentally hazardous. The removal and disposal of sludge produced in the bath is a serious environmental problem. If the sludge contaminates the surface to be coated, then the coated metal surface will be defective.

In the multi-step processes, phosphate coatings are quite porous and begin to degenerate shortly after application if not quickly recoated with a suitable primer. In less than four days the unprotected iron phosphate film will deteriorate to a point where there is little corrosion protection.

The multi-step processes can also include a chromic acid rinse to seal the phosphatized metal surface prior to applying the coating. The chromic acid is usually hexavalent chromium which is highly toxic and therefore undesirable.

The multi-step processes also utilize a large amount of volatile organic compounds (VOCs) that are hazardous to the environment.

U.S. Pat. No. 1,995,954 to Albrecht discloses a coating composition containing phosphoric acid and rust-inhibiting derivatives thereof as rust-resisting agents and a paint. The Albrecht composition lacks an additive package having complexes and a cross-linking agent in the paint, both of which are disclosed herein.

U.S. Pat. No. 4,032,678 to Perfetti et al. discloses a thermosetting organic coated sheet metal product having a partially cured coating which bonds to the metallic substrate (C1 L50-52). Perfetti does not disclose a single coat self-phosphatizing paint because the organic coating is subsequently treated with a protective and/or decorative coating applied thereon as the top or finish coat (C2, L64-C3, L2).

U.S. Pat. No. 4,508,765 to Ring et al. discloses synthetic resins and coating compositions for coating metal substrates, particularly food and beverage cans. The resin includes the reaction product of a water insoluble phenolic resin or a water insoluble amino resin with an epoxy resin and a phosphoric acid (C1, L46-50). The reaction of the phenolic or amino resin with the epoxy and acid occurs prior to the application of the composition on a substrate.

Lin et al., *Chemistry of a Single-Step Phosohate/Paint System*, Ind. Eng. Chem. Res., Vol. 31, No. 1, 1992 discloses a single-step phosphate/paint system that utilizes phosphoric acid, a resin and a cross-linking agent. The phosphoric acid results in the paint system being unstable as the acid can react with the other paint components or catalyze the reaction of the components. The stability and compatibility of the Lin paint are limited and only clear, unpigmented paints have been produced. The Lin paint requires a large amount of solvent, which increases the VOCs, that is miscible with both the phosphoric acid and the other components. If the Lin paint utilizes a resin and cross-linking agent combination other than polyester - melamine enamel or a pigment, it becomes useless in a short period of time because of the reactions, e.g., the self-condensation of the cross-linking agent, the co-condensation reaction of the resin with the cross-linking agent and aggregation of the pigment due to the highly acidic (pH<2.0) condition, of the components prior to application to the surface.

There is a desire for a single coat, in situ self-phosphating paint that is easy to use, does not require meticulous cleaning of the surface, eliminates the need for separate phosphate conversion and subsequent coating steps, eliminates the bath, reduces VOCs, is stable and can be pigmented. Preferably, the paint will protect plastic and wood surfaces in addition to metal surfaces. The present additive package can be used to make a paint that satisfies at least some of these desires.

SUMMARY OF THE INVENTION

The additive package of the present inventions is suitable for use in a single coat, self-phosphating paint that reacts in situ on a surface of a substrate to provide a non-conductive phosphate layer to inhibit corrosion of the substrate, with the paint also forming a topcoat that reacts with the layer to improve adhesion to the topcoat. The additive package includes an amine and at least one phosphatizing reagent selected from a group of alkyl-, phenyl- and aryl- ester phosphoric acids and alkyl-, phenyl- and aryl- phosphonic acids. The reagent and the amine are present in a ratio effective to produce reagent-amine complexes that stabilize the reagent even though they are weak complexes.

The complexes combine more readily with other components of the paint without excessive amounts of organic solvent as is required when phosphoric acid is utilized. Hence, the volatile organic compounds (VOCs) content of the paint is reduced as compared to phosphoric acid-containing paint due to the reduction in the solvent. The present paint uses a more hydrophobic reagent, as compared to phosphoric acid, to avoid the problems associated with phosphoric acid in its free form. The surface is protected and the disadvantages of phosphoric acid are avoided because phosphoric acid is not used.

The complexes dissociate on the surface so that the free reagent is available to chemically and/or mechanically react in situ with the surface to form the phosphate layer.

Admixing the additive package with a polymer coat forming resin and a cross-linking agent produces the single coat self-phosphatizing paint. Alternatively, the paint can be produced by admixing the additive package with a coating composition that includes the resin. If the coating composition does not include the cross-linking agent, one is added. Due to the complexing of the acidic reagent with the amine, the paint can be pigmented without aggregation of the pigment.

A method of protecting the surface of the substrate includes the steps of applying the paint to the surface and forming a dry, protective coat from the paint on the surface.

Paints utilizing the additive package are capable of inhibiting corrosion of the substrate in a single step application which is inherently better than a multi-step process because of the reduction in the number of steps.

The meticulous cleaning pretreatment of the metal surface that was required with the aforementioned multi-step processes is not necessary when the paint is utilized. Thus, a reduction in the number of defects that arise from improper cleaning pretreatment is obtained by utilizing the paint.

The paint eliminates the need for the iron phosphating and the zinc phosphating processes and their baths which results in elimination of the tight chemical controls of the iron phosphate bath, the environmentally hazardous additives of the zinc phosphating process and the sludge production in the bath. The elimination of the sludge eliminates the defective surfaces due to sludge being on the surface.

The problems of porosity and degradation associated with multi-step processes are avoided because the phosphate chemistry and the polymer chemistry in the unicoat system proceeds independently and simultaneously.

Numerous other advantages and features of the present invention will become readily apparent from the following detailed description of the preferred embodiments and the appended claims.

DETAILED DESCRIPTION OF THE PREFERRED EMBODIMENTS

Although this invention is susceptible to embodiment in many different forms, there will be described in detail, presently preferred embodiments of the invention. It should be understood, however, that the present disclosure is to be considered as an exemplification of the principles of this invention and is not intended to limit the invention to the embodiments illustrated.

An additive package can be used in a single coat, in situ self-phosphatizing paint that protects a surface of a substrate to which the paint is applied. The additive package includes at least one phosphatizing reagent and an amine in a weight ratio effective to produce reagent-amine complexes that are weak and that stabilize the reagent.

The term "in situ", when referring to the paint, indicates that substantially no irreversible chemical reactions occur prior to the application of the paint to the substrate and that substantially all of the irreversible chemical reactions occur when the paint is on the substrate.

The term "irreversible chemical reaction", as used in its various grammatical forms, identifies a reaction that cannot be reversed to yield constituents capable of subsequent reaction.

The term "corrosion", as used in its various grammatical forms, refers to the degradation of the substrate as, for example, the electrochemical degradation of metals or their alloys, the rotting of wood and the breakdown of the chemical bonds of plastics.

The paint can be made by admixing the additive package to a coating composition that includes a polymer coat forming resin. A cross-linking agent is added if one is not already present in the coating composition. Alternatively, the additive package can be admixed with a polymer coat forming resin and a cross-linking agent to produce the paint.

Application of the paint to a surface of the substrate produces a coating that includes a non-conductive phosphate layer contiguous with the surface to inhibit corrosion of the surface and a topcoat. The layer is a result of phosphate chemistry. When the paint is applied to the substrate and exposed to heat, ultraviolet light or air drying, the complexes dissociate into the reagent and the amine. The reagent migrates to the surface and reacts with the substrate to provide the non-conductive phosphate layer that provides the corrosion protective barrier and which has good adhesion to the substrate. The reaction results in chemical functional groups that are presently theorized to react with the resin and the cross-linking agent to form phosphorus, oxygen and carbon (P—O—C) covalent bonds to improve adhesion of the topcoat to the layer and hence the substrate. The topcoat is the result of polymer chemistry. The reagent also catalyze polymerization of the resin and cross-linking agent.

The reagents are acidic and can react prior to application to the substrate if the reagents are not properly dispersed in the paint. The reaction can be a self-condensation reaction of the cross-linking agent, a co-condensation reaction of the resin with the cross-linking agent or particle aggregation of the pigment. The amine helps to stabilize the reagent and inhibit these reactions occurring prior to application to the substrate by forming the weak complexes with the reagent.

To further increase the stability of the reagent, other components of the additive package or the paint are one or more of a solvent, a surfactant and metal salts.

The solvent is miscible with both the reagent and the resin. The reagent is dispersed in the solvent. Therefore, the distance between reagent and resin molecules is greatly increased so that the opportunity for them to get close enough to react is greatly decreased.

The surfactant can be nonionic, anionic or cationic and is a highly effective emulsifier. As the concentration of the surfactant increases at or above the critical micellar concentration (CMC) value a micellar/bilayer emulsion is established. It is theorized that the emulsion is configured with the resin in the hydrophobic phase as droplets and the reagent in the hydrophilic phase.

The reagent can dissociate in an aqueous solution to a hydronium ion and a conjugate anion in equilibrium. The reaction of hydronium ions and the paint components allow the dissociation to continue until the paint is destroyed. When the metal salt containing the same conjugate anion as the dissociated reagent is added, the conjugate anions from the metal salt stabilize the reagent by stopping or reversing dissociation. This activity of the conjugate ions of the metal salt is referred to as the common-ion effect. Also, it is presently theorized that the metal ion of the metal salt becomes associated with the phosphate layer and contributes to the inhibition of corrosion as a component of the layer.

Representative phosphatizing reagents include ester phosphoric acids and phosphonic acids in general and, more specifically, mono- and di-alkyl phosphoric acid, mono- and di-alkyl phosphonic acid, mono- and di-phenyl phosphoric acid, mono- and di-phenyl phosphonic acid, mono- and di-aryl phosphoric acid, mono- and di-aryl phosphonic acid, the like and mixtures thereof. The alkyl groups can have 1 to about 12 carbon atoms. Preferred reagents are mono- and di-phenyl phosphoric acid and mono- and di-phenyl phosphonic acid.

The amine is a primary, secondary or tertiary amine, preferably a secondary or tertiary amine. Representative amines are alkyl amines, phenyl amines, aryl amines and substituted phenyl amines in general and, more specifically, triethylamine, diphenylamine, triphenylamine, the like and mixtures thereof. The alkyl group preferably has 1 to about 6 carbon atoms.

The coating composition can include as components, in addition to the resin, cross-linking agents, pigments, extenders and fillers, accelerators and solvents. If the coating composition does not contain a cross-linking agent one is added. The resins and cross-linking agents with which the additive package is admixed can be the same as those utilized in the coating composition.

Representative resins include alkyd resins, phenol formaldehyde resins, polyester resins, epoxy resins and alkyl vinyl resins. The alkyl group of the alkyl vinyl resin preferably contains one to about five carbon atoms. Commercially available polyester resins include Cargill resin #5778 and McWhorter Polymac #935. A commercially available alkyd resin is Cargill #7450.

The cross-linking agent cross-links the resin to produce a hard, impermeable topcoat over the non-conductive layer. The selection of the cross-linking agent primarily depends upon the selection of the resin. Representative of the cross-linking agents are substituted and unsubstituted melamine formaldehyde and urea formaldehyde. The formaldehyde can be alkylated or be a corresponding alkyloxy analog. Preferably the alkyl group has one to about five carbon atoms. Representative of these substituted melamine formaldehydes are methylated melamine formaldehyde (commercially available from American Cyanamid under the trademark CYMEL) and hexakis(methoxymethyl)melamine formaldehyde (commercially available from Monsanto under the trademark RESIMENE). A melamine formaldehyde cross-linking agent is commercially available from Reichold under the trademark SUPER-BECKAMINE RESIN. A urea formaldehyde resin is commercially available from Monsanto under the trademark RESIMENE 970. Other commercially available cross-linking agents include Monsanto's RESIMENE #745 and #970, American Cyanamid's CYMEL #303 and Reichold's 2-625 Beckamine.

Representative surfactants include oxyalkylated alkyl phenols such as Triton X-100 commercially available from Rohm & Haas, N-lauroylsarcosine, sodium dioctyl sulfosuccinate commercially available from American Cyanamid under the designation Aerosol Space (75%).

Metal ions and the conjugate anions of a metal salt can be obtained by utilizing zinc phosphate, iron phosphate, zinc iron phosphates and zinc molybdate in the paint.

The solvent is preferably water miscible. Representative solvents include aliphatic alcohols, e.g., isopropyl alcohol, butyl alcohol and the like, aromatic and aliphatic hydrocarbons, glycol ethers, alkyl carbitols, e.g., butyl carbitol, aromatic and aliphatic solvents, water, the like and mixtures thereof. The alkyl groups preferable have one to about five carbon atoms. It is important that the paint include water. Although the role of the water is not completely understood it is presently theorized that the water promotes compatibility between the reagent-amine complexes, the pigments and the resin.

The amount of water present in the paint varies. Water can be the only solvent utilized. If an organic solvent is present, then water can constitute about 0.5 to about 90% by weight of the total weight of the paint.

Representative pigments include carbon black, titanium dioxide Cu-phthalocyanine blue, Cu-phthalocyanine green, chrome yellow, iron oxide red and the like.

Preferably, the accelerator is present to accelerate the reaction among the reagent, resin and the substrate. Representative accelerators include metal nitrates, nitrates, hydrogen peroxide, hydrazide and the like.

The paint can include other conventional components that do not form a part of the invention.

The weight ratio of the reagent to the amine is in the range of about 2:1 to about 1:1.5.

The paint contains the reagent in an amount in the range of about 0.5 to about 10, preferably about 0.5 to about 5, weight percent (wt %), the amine in an amount in the range of about 0.25 to about 15, preferably about 0.3 to about 7.5, wt %, the resin in an amount in the range of about 10 to about 70, preferably about 10 to about 55, wt %, the cross-linking agent in an amount in the range of about 1 to about 20, preferably about 5 to about 15, wt %, the solvent in an amount in the range of about 0.5 to about 90 wt %, the surfactant in an amount in the range of about 0.1 to about 8 wt %, the metal salt in an amount in the range of about 0.5 to about 5 wt % and pigment in an amount up to about 50 wt %, the wt %s being based upon the total weight of the paint.

Preferably, the reagent is present in an amount in the range of about 2 to about 15 wt % based on the total weight of the solvent.

Preferably, the water is present in an amount in the range of about 1 to about 400 wt % based on the total weight of the solvent.

Preferably, the additive package is produced prior to admixing with the coating composition or the resin and cross-linking agent. The reagent and amine are admixed to produce the reagent-amine complexes. The conditions under which the additive package is preferably produced are by dispersing reagent and amine seperately in solvent at about ambient conditions to produce a reagent solution and an amine solution. The reagent solution is then added slowly to the amine solution while mixing.

The term "ambient condition", as used in its various grammatical forms, identifies a temperature in the range of about 50° to about 90° F. and a pressure of about atmospheric pressure.

Preferably, one or more of the solvent, surfactant and metal salt are also part of the additive package to further stabilize the reagent.

Alternatively, the additive package can be made in the paint by adding some or all of the components of the paint into a suitable vessel and mixing.

The paint is produced by admixing the components under ambient conditions for a time period effective to produce a homogeneous mixture.

Representative substrates to which the paint can be applied include metal, e.g., steel, iron, copper, aluminum, the like and their alloys, wood and thermoplastic and thermoset plastics.

The method of protecting the surface includes the steps of applying the paint to the surface and forming a dry protective coating from the paint on the surface. Preferably, the thickness of the paint applied to the substrate is in the range of about 0.1 to about 3 mil so that most of the reagent can migrate to the surface which minimizes the amount of reagent that remains in the coating after it dries.

The paint on the surface is dried using heat, UV light or air drying which dissociates the complexes, drives off the solvents and contributes to the breakdown of the micelles if a surfactant is utilized. The net result is the formation of the phosphate layer and the topcoat.

When heat is used, preferably the paint is cured at a temperature in the range of about 250° to about 480° F. for a time period of about 40 seconds to about 30 minutes. The higher temperature results in a shorter curing time.

The following examples are provided by way of representation and not limitation.

COMPARATIVE EXAMPLE 1: PHOSPHORIC ACID-CONTAINING PAINT

This comparative paint uses phosphoric acid as an in situ phosphatizing reagent. The comparative paint is not stable, compatible or usable when a resin other than a water extendable polyester is utilized. The comparative paint cannot be pigmented due to its acidity which would result in the aggregation of the pigment. The formulation of the comparative paint is provided in TABLE I, below.

TABLE I

| COMPARATIVE PAINT FORMULATION | |
|---|---|
| COMPONENT | PARTS BY WEIGHT |
| Water extendable polyester (Cargill Resin #5778, or McWhorter polymac #935) | 532 |
| Cross-linking agent (Resimene #745 or Cymel #303) | 135 |
| Isopropanol (or Butyl carbitol) | 308 |
| Water | 5 |
| Phosphoric acid | 20 |

The term "water extendable", as used in its various grammatical forms, means that a portion of the solvent can be replaced by water.

The following Examples 1 to 4 of paints use the additive package. The paints are stable, compatible and usable, and exhibit excellent performance for commonly used resins and cross-linking agents for both clear and pigmented paints. In the following Examples, $R_3$-amine is triethylamine, $R_3'$-amine is triphenylamine, $R'$-phosphoric acid is monophenylphosphoric acid and $R'$-phosphonic acid is monophenylphosphonic acid.

EXAMPLE 1: REPRESENTATIVE PAINTS CONTAINING VARIOUS CROSS-LINKING AGENTS

Clear paints can utilize a polyester resin with different commercially available cross-linking-agents. The formulations are provided in TABLE II, below.

TABLE II

| PAINTS UTILIZING VARIOUS CROSS-LINKING AGENTS | |
|---|---|
| COMPONENTS | PARTS BY WEIGHT |
| Water extendable polyester (Cargill Resin #5778, or McWhorter Polymac #935) | 532 |
| Cross-linking agent (Resimene #745, Cymel #303, Monsanto Resimene #970, Reichold 2-625 Beckamine) | 135 |
| Isopropanol (or Butyl carbitol) | 293 |
| Water | 5 |
| $R_3$-amine (or $R_3'$-amine) | 15 |
| $R'$-phosphoric acid (or $R'$-phosphonic acid) | 20 |

EXAMPLE 2: WHITE PAINT FORMULATION WITH ALKYD RESIN

A paint pigmented white and utilizing a alkyd resin can have the formulation provided in TABLE III, below.

TABLE III

| WHITE PAINT FORMULATION WITH ALKYD RESIN | |
|---|---|
| COMPONENT | PARTS BY WEIGHT |
| Alkyd resin (Cargill #7450) | 252 |
| Dimethylethanol amine | 11 |
| Cross-linking agent (Resimene #745 or Cymel #303) | 25 |
| Titanium dioxide R 900/28 pigment | 200 |
| Butyl carbitol | 70 |
| Isopropyl alcohol | 50 |
| Butyl cellusolve | 7 |
| $R'$-phosphoric acid (or $R'$-phosphonic acid) | 20 |
| $R_3$-amine (or $R_3'$-amine) | 15 |
| Water | 350 |

EXAMPLE 3: WHITE PAINT FORMULATION WITH POLYESTER RESIN

A paint pigmented white and utilizing a polyester resin can have the formulation provided in TABLE IV, below.

TABLE IV

| WHITE PAINT FORMULATION WITH POLYESTER RESIN | |
|---|---|
| COMPONENT | PARTS BY WEIGHT |
| Water extendable polyester (Cargill Resin #5778, or McWhorter Polymac #935) | 322 |
| Cross-linking agent (Resimene #745 or Cymel #303) | 81 |
| TiO$_2$ R900/28 pigment | 372 |
| Butyl carbitol | 136 |
| Isopropyl alcohol | 50 |
| Water | 5 |
| $R_3$-amine (or $R_3'$-amine) | 15 |
| $R'$-phosphoric acid (or $R'$-phosphonic acid) | 20 |

EXAMPLE 4: BLACK PAINT FORMULATION WITH POLYESTER RESIGN

A paint pigmented black and utilizing a polyester resin can have the formulation provided in TABLE V, below.

TABLE V
BLACK PAINT FORMULATION WITH POLYESTER RESIN

| COMPONENT | PARTS BY WEIGHT |
|---|---|
| Water extendable polyester (Cargill Resin #5778, or McWhorter Polymac #935) | 225 |
| Cross-linking agent (Resimene #745 or Cymel #303) | 420 |
| Sodium dioctyl sulfosuccinate Surfactant (Cyanamid Aerosol OT 75%) | 6 |
| Butyl carbitol | 213 |
| Xylene | 30 |
| Graphite 95% 325 mesh pigment | 6 |
| Black pearls 900 carbon black pigment | 60 |
| R'-phosphoric acid (or R'-phosphonic acid) | 20 |
| $R_3$-amine (or $R_3'$-amine) | 15 |
| Water | 5 |

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

I claim:

1. A single coat, in situ self-phosphatizing, paint for a surface, the paint comprises:
   a polymer coat forming resin;
   a cross-linking agent; and
   an additive package comprising at least one phosphatizing reagent selected from the group consisting of esters of (1) alkyl- and aryl- phosphoric acids and (2) alkyl- and aryl- phosphonic acids and an amine, and at least one of a solvent, a surfactant or a metal salt having conjugate anions of the reagent, the reagent and amine being present in a weight ratio effective to produce reagent-amine complexes, the paint providing corrosion resistance and protection to the surface.

2. A single coat, in situ self-phosphatizing, paint for a surface, the paint comprises:
   a polymer coat forming resin;
   a cross-linking agent;
   an additive package comprising at least one phosphatizing reagent selected from the group consisting of esters of (1) alkyl- and aryl- phosphoric acids and (2) alkyl- and aryl- phosphonic acids and an amine, and at least one of a solvent, a surfactant or a metal salt having conjugate anions of the reagent, the reagent and amine being present in a weight ratio effective to produce reagent-amine complexes, the paint providing corrosion resistance and protection to the surface;
   a solvent, a surfactant, a metal salt containing the same conjugate anion as the dissociated reagent and, optionally, a pigment, wherein the paint contains the reagent in an amount in the range of about 0.5 to about 10 weight percent (wt %), the amine in an amount in the range of about 0.25 to about 15 wt %, the resin in an amount in the range of about 10 to about 70 wt %, the cross-linking agent in an amount in the range of about 1 to about 20 wt %, the solvent in an amount in the range of about 0.5 to about 90 wt %, the surfactant in an amount in the range of about 0.1 to about 8 wt %, the metal salt in an amount in the range of about 0.5 to about 5 wt % and the pigment in an amount up to about 50 wt %, the wt %s being based upon the total weight of the paint.

3. A single coat, in situ self-phosphatizing, paint for a surface, the paint comprises:
   a polymer coat forming resin present in an amount in the range of about 10 to about 70 weight percent (wt %);
   a cross-linking agent present in the range of about 1 to about 20 wt %; and
   an additive package comprising:
   at least one phosphatizing reagent selected from the group consisting of esters of (1) alkyl- and aryl-phosphoric acids and (2) alkyl and aryl- phosphonic acids, the reagent being present in an amount in the range of about 0.5 to about 10 wt %;
   an amine present in an amount in the range of about 0.25 to about 15 wt %, the reagent and amine being present in a weight ratio effective to produce reagent-amine complexes, the weight percents being based upon the total weight of the paint, the paint providing corrosion resistance and protection to the surface; and
   at least one of a solvent, a surfactant or a metal salt having conjugate anions of the reagent.

4. The paint of claim 1 wherein the at least one phosphatizing reagent is selected from the group consisting of esters of aryl-phosphoric acids and aryl-phosphonic acids.

5. The paint in accordance with claim 1 wherein the aryl group of the phosphatizing reagent is a phenyl group.

6. The paint in accordance with claim 1 further comprising a pigment.

7. The paint in accordance with claim 1 wherein the reagent is present in the paint in an amount in the range of about 0.5 to about 10 weight percent based on the total weight of the paint.

8. The paint in accordance with claim 1 wherein the paint further comprises a solvent, a surfactant, a metal salt and, optionally, a pigment, wherein the paint contains the reagent in an amount in the range of about 0.5 to about 10 weight percent (wt %), the amine in an amount in the range of about 0.25 to about 15 wt %, the resin in an amount in the range of about 10 to about 70 wt %, the cross-linking agent in an amount in the range of about 1 to about 20 wt %, the solvent in an amount in the range of about 0.5 to about 90 wt %, the surfactant in an amount in the range of about 0.1 to about 8 wt %, the metal salt in an amount in the range of about 0.5 to about 5 wt % and the pigment in an amount up to about 50 wt %, the wt %s being based upon the total weight of the paint.

9. The paint in accordance with claim 1 wherein the paint further comprises a solvent, a surfactant, a metal salt and, optionally, a pigment, the paint contains the reagent in an amount in the range of about 0.5 to about 5 weight percent (wt %), the amine in an amount in the range of about 0.3 to about 7.5 wt %, the resin in an amount in the range of about 10 to about 55 wt %, the cross-linking agent in an amount in the range of about 5 to about 15 wt %, the solvent in an amount in the range of about 0.5 to about 90 wt %, the surfactant in an amount in the range of about 0.1 to about 8 wt %, the metal salt in an amount in the range of about 0.5 to about 5 wt % and the pigment in an amount up to about 50 wt %, the wt %s being based upon the total weight of the paint.

10. The paint in accordance with claim 1 wherein the additive package has a weight ratio of reagent to amine in in the range of about 2:1 to about 1:1.5.

11. The paint in accordance with claim 1 wherein the reagent is selected from the group of monophenyl phosphoric acid or monophenyl phosphonic acid.

12. The paint in accordance with claim 1 wherein the amine is selected from the group of secondary alkyl amines, tertiary alkyl amines, secondary phenyl amines, tertiary phenyl amines, secondary aryl amines or tertiary aryl amines.

13. The paint in accordance with claim 1 wherein the additive package is made prior to admixing with other components of the paint.

14. A method of protecting a surface of a substrate comprising the steps of:
applying the paint in accordance with claim 1 to the surface; and
forming a dry, protective coating from the paint on the surface.

15. The method in accordance with claim 14 wherein the forming step includes the dissociation of the complexes.

16. The method in accordance with claim 14 wherein the substrate is selected from the group consisting of metal, wood and plastic.

17. The method in accordance with claim 14 wherein the coat forming step includes the simultaneous reaction of the phosphate chemistry and the polymer chemistry.

* * * * *